Figure 1:
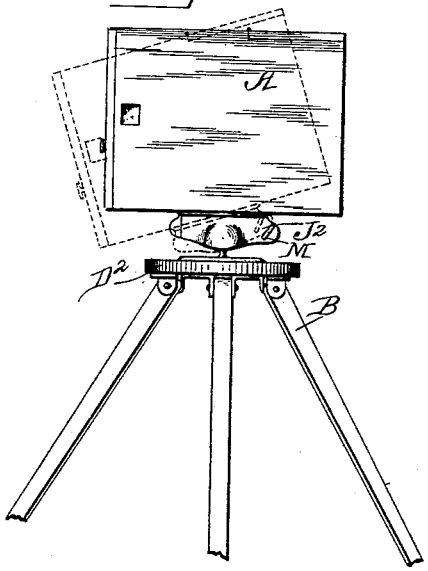

No. 631,031. Patented Aug. 15, 1899.
A. H. SPURR.
ADJUSTING DEVICE BETWEEN TRIPODS AND CAMERAS OF PHOTOGRAPHIC APPARATUS.
(Application filed Apr. 11, 1898.)
(No Model.)

Witnesses
J. B. Weir
L. M. Bulkley

Inventor,
Arthur H. Spurr
By Chas. C. Bulkley,
Atty.

THE NORRIS PETERS CO., PHOTO-LITHO., WASHINGTON, D. C.

UNITED STATES PATENT OFFICE.

ARTHUR H. SPURR, OF CRESTON, IOWA.

ADJUSTING DEVICE BETWEEN TRIPODS AND CAMERAS OF PHOTOGRAPHIC APPARATUS.

SPECIFICATION forming part of Letters Patent No. 631,031, dated August 15, 1899.

Application filed April 11, 1898. Serial No. 677,145. (No model.)

*To all whom it may concern:*

Be it known that I, ARTHUR H. SPURR, a citizen of the United States, residing at Creston, in the county of Union and State of Iowa, have invented a certain new and useful Improvement in Adjusting Devices Between Tripods and Cameras of Photographic Apparatus, of which the following is a specification.

My invention relates to a certain improved device for use in connection with the tripod and camera of a photographic apparatus.

As is well known in the art of photography, the camera is usually mounted upon a tripod, which rests upon the ground when the camera is in use.

In order to properly position the object to be photographed upon the ground glass or view-finder, it is necessary to adjust the camera bodily in various differing angles, and this has been in a measure imperfectly accomplished by the adjustment of some one or more of the legs or supports of the tripod. Thus to vary the angle of the camera one of these legs or supports is moved toward or away from the center of gravity of the apparatus. At best it is impossible to obtain minute angular adjustment by such means, and oftentimes it is impossible to obtain any effective adjustment owing to the uneven surface of the ground upon which the tripod must rest. Again, frequently to obtain proper adjustment one leg or support of the tripod may be so close to the center of gravity of the apparatus that the slightest jar will upset the apparatus, and then again it is often necessary to hold or brace one of the legs while the picture is being taken to prevent the apparatus from falling to the ground and to maintain the camera in the adjusted position. It is also evident that such a means of adjustment is inconvenient and requires repeated manipulation. The operator in order to properly position the objects upon the ground glass or view-finder must concentrate his vision upon the objects and their relation to the ground glass or view-finder and frequently finds it necessary to effect an adjustment with his vision directed upon the object and without removing his eye from the ground glass or view-finder. In order to accomplish an adjustment with the present apparatus, it is necessary to reach with the hand and arm and grasp one of the tripod-legs and laboriously and awkwardly move it toward or from the center of gravity until the proper angular adjustment of the camera is obtained. This effort in adjustment more or less disturbs the direction of vision of the operator upon the ground glass or view-finder and renders it difficult to position the objects upon the ground glass or view-finder with accuracy. Again, when an angular adjustment has been obtained by this movement of the legs it frequently occurs that the end of the leg sinks into the soft ground or strikes a movable object, which disturbs the adjustment, and when the picture is taken it is found to be improperly positioned.

The object of my invention is to provide means whereby to overcome all of these defects and to effect angular adjustments by means conveniently and absolutely within the control of the operator which permit minute and accurate adjustments of the camera and which when obtained shall always remain in the adjusted position.

My invention consists in certain features about to be described, and pointed out in my claims, reference being now made to the accompanying drawings, in which—

Figure 2:
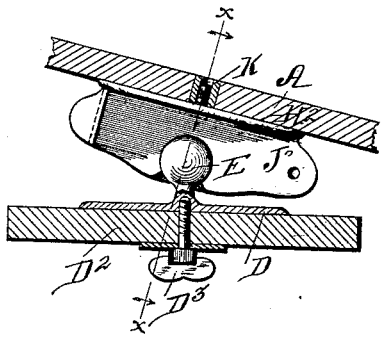
Figure 4:
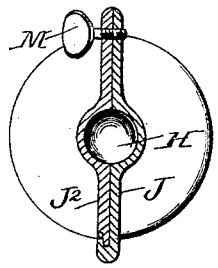
Figure 3:
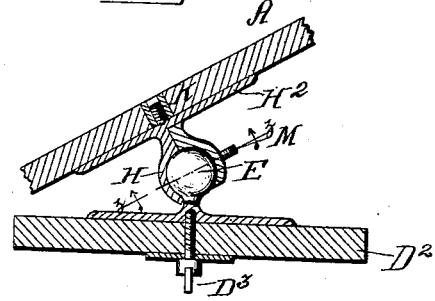
Figure 5:
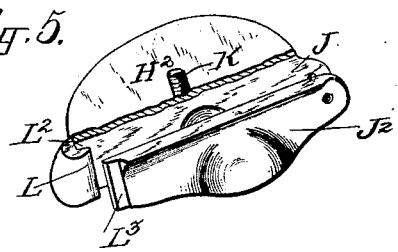

Figure 1 is a side elevation of a camera and tripod with my improved device between them, the dotted lines showing a vertical adjustment. Fig. 2 is an enlarged side view of my improved connection with one member of the clamp removed. Fig. 3 is a cross-section on the line $xx$ of Fig. 2 in the direction of the arrows. Fig. 4 is a sectional plan view on the line $zz$ of Fig. 3. Fig. 5 is a perspective view of the removable member of the clamp and its relation to the stationary member thereof.

The camera is designated at A, of ordinary construction and mounted upon the tripod-support B. The connecting device which I interpose between the tripod B and the camera A consists of a supporting-tripod disk D, which is mounted upon the tripod-head $D^2$ and held in place by means of a thumb-screw $D^3$, Fig. 2. Projected upward from the disk D is a spherical head E, which is received within a cup-shaped receptacle H, which projects downward from a camera-disk H². This cup-shaped receptacle H is formed by joining together two clamping pieces or members, one of which may be termed the "stationary" member, as it is secured to the disk H² and which is designated at J. The other piece or member J² may be termed the "removable" member, as it is capable of being separated from its position in connection with the member J. The disk H² is held upon the camera-box A by means of the screw-threaded pin K. One end of the stationary member J has an inturned lip L, forming a groove L² for the reception of the attenuated end L³ of the member J². Thus when the end L³ is within the groove L² the two clamping members J and J² are united together at this point. The other two ends of the clamping members are held together by means of the thumb-screw M.

It will be observed from the foregoing description that I have provided a connection between the camera and the tripod which permits a movement of the camera upon the tripod in any direction to adjust the camera at any required angle in order to properly position the object or objects upon the ground glass or view-finder. Thus, as shown by the dotted lines in Fig. 1, the camera is shown adjusted angularly in one desired position in a vertical direction, and in Fig. 2 the camera is shown vertically adjusted in another angular position in a different direction, and in Fig. 3 the camera is shown adjusted laterally at still another angle. In effecting this adjustment the cup-shaped receptacle H moves upon the circular head E universally, and thus permits any desired angular adjustment of the camera upon the supporting-tripod.

To effect adjustment and properly position the object or objects upon the ground glass or view-finder, the operator preferably selects a desirable spot upon which to place the tripod. The ends of the tripod-legs are then inserted and ascertained to be in a firm permanent position. With my improved device when the legs of the tripod are placed in position they are not again disturbed or moved in any manner to effect the necessary angular adjustment. The operator then proceeds to position the object or objects upon the view-finder or ground glass by grasping the camera-box and simply and easily turning it to any desired angle in order to accomplish the necessary ends. By this bodily movement of the camera the objects may be adjusted accurately and readily upon the ground glass or view-finder and this result accomplished without interfering with the vision of the operator.

Oftentimes the uneven surface of the ground renders it difficult to obtain a proper angular adjustment of the camera by shifting the legs of the tripod. Thus, for instance, upon the side of a hill or in a ravine it is often extremely difficult or impossible to obtain the necessary adjustment angularly by shifting the legs of the tripod. In this class of apparatus heretofore by reason of the inflexible connection between the camera and the tripod no other means is afforded for obtaining angular adjustments than the shifting of the tripod-legs, whereas with my improved device the adjustments are effected by the bodily movement of the camera, the tripod-legs remaining permanently in the original position of adjustment. As these tripod-legs always remain in permanently-adjusted position and as the operator is always afforded the opportunity of selecting a proper place for the lower end of each of the tripod-legs and plants them in a firm position, the effected adjustment is never disturbed by any dislocation.

It is evident that heretofore when the adjustment is effected by shifting the tripod-legs the ends of the legs are not positioned in a selected place and often encounter a movable object or soft ground, which disturbs the angular adjustment.

By means of the two-part clamping member containing the receptacle for the head and the thumb-screw acting upon the clamp I am enabled to secure the adjustment of the camera in relation to the fixed tripod, and when the required angle has been obtained then the camera may be locked or securely held in the adjusted position upon the fixed tripod.

Under certain circumstances it is frequently necessary to obtain the adjustment of the camera at an acute angle, and the tripod-leg is positioned either in such close proximity to the center of gravity as to require a brace to hold it from falling or to hold it in position with the hand. With my improved apparatus, however, it is evident that this is not necessary.

Having thus described my invention, what I claim as new therein, and desire to secure by Letters Patent, is—

1. The combination with the camera and tripod of a photographic apparatus, of a connection therefor comprising a globular head provided with means for securing it to one of the members composing the apparatus; a couple of vertically-disposed and horizontally-separable plates constructed so as to provide a socket for said globular head, one of said plates having one of its ends provided with a groove, and the other plate having its end adapted to fit within said groove; and means for locking the opposite ends of said plates in adjustment.

2. The combination with the camera and tripod of a photographic apparatus, of a connection therefor comprising a plate or disk provided with a globular head and adapted for securement to one of the members of the apparatus; a couple of vertically-disposed plates adapted to provide a socket for said head, one of said plates having one of its ends provided with a groove, and being constructed with a laterally-extending base adapted for securement to the other member of the apparatus, and the other of said socket providing plates having one of its ends adapted to fit within the groove on the other one; and a thumb-screw or like device for locking the free end of the last-mentioned plate in adjustment in connection with the first-mentioned one.

In testimony whereof I affix my signature in presence of two witnesses.

ARTHUR H. SPURR.

Witnesses:
CHAS. C. BULKLEY,
L. M. BULKLEY.